(12) United States Patent
Kim

(10) Patent No.: US 6,369,903 B1
(45) Date of Patent: Apr. 9, 2002

(54) TECHNIQUE FOR DEBUGGING SCANNING AND PRINTING SYSTEM

(75) Inventor: Kwang-seuk Kim, Kyonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/139,727

(22) Filed: Aug. 31, 1998

(30) Foreign Application Priority Data

Aug. 30, 1997 (KR) .............................................. 97/44493

(51) Int. Cl.[7] .................................................. B41F 1/56
(52) U.S. Cl. ........................ 358/1.13; 358/468; 358/448
(58) Field of Search ................................. 358/448, 468, 358/1.13, 327, 463, 452, 443, 406, 407; 700/26; 712/227

(56) References Cited

U.S. PATENT DOCUMENTS

| | | | | |
|---|---|---|---|---|
| 4,791,492 A | * | 12/1988 | Nagashima et al. | 358/256 |
| 5,134,501 A | | 7/1992 | Satomi et al. | 348/400 |
| 5,589,878 A | | 12/1996 | Cortjens et al. | 348/211 |
| 5,764,866 A | * | 6/1998 | Maniwa | 395/114 |
| 5,768,483 A | * | 6/1998 | Maniwa et al. | 395/114 |
| 5,818,609 A | * | 10/1998 | Yamamura | 358/468 |
| 5,859,956 A | * | 1/1999 | Sugiyama et al. | 395/112 |

* cited by examiner

Primary Examiner—David Moore
Assistant Examiner—Kevin C Kianni
(74) Attorney, Agent, or Firm—Robert E. Bushnell, Esq.

(57) ABSTRACT

A debugging device in an apparatus having a scanning and printing function includes: an input unit for inputting a defects tracing mode and for selecting a function; a facsimile machine driving unit for driving a facsimile machine to transmit and receive facsimile data and generated operating status messages of the facsimile machine; a printer driving unit for driving a printing unit to print data and generated operating status messages of the facsimile machine; a storing unit for storing the generated status messages; and a processing unit for replying a defects-generated job, storing the generated messages in the storing unit, and outputting the stored messages according to the selection of the function. The debugging device in an apparatus having a scanning and printing function generates status messages according to running states of the scanning and printing system. Generally, the generated messages are ignored in cases where defects are not generated. However, the generated messages are stored in a memory by setting the defects tracing mode, and are accessed by an operator, if necessary, in cases where defects are generated.

7 Claims, 5 Drawing Sheets

TECHNIQUE FOR DEBUGGING SCANNING AND PRINTING SYSTEM

CLAIM OF PRIORITY

This application makes reference to, incorporates the same herein, and claims all benefits accruing under 35 U.S.C. §119 from an application for APPARATUS AND METHOD FOR DEBUGGING IN SCANNING AND PRINTING SYSTEM earlier filed in the Korean Industrial Property Office on of Aug. 30, 1997 and there duly assigned Serial No. 44493/1997.

BACKGROUND OF THE INVENTION

1. Field of the Invention

The present invention relates to a technique for debugging a scanning and printing system, and more particularly to a technique for debugging a scanning and printing system enabling effective detection of the cause of defects by replaying the job with the defects in those cases where the defects are generated in the scanning and printing system and application programs, and by storing status messages relating to this operation, and by providing an operator with them.

2. Description of the Related Art

Nowadays, office automation facilities such as printers, scanners, etc., have widely been used. To extend their own functions, high performance office automation facilities have been developed. Accordingly, the manufacturing costs of the products increase. On the other hand, the economic burden on users can be lessened by integrating, for instance, a printer and a scanner which have separately been used. Such products are called scanning and printing systems.

In general, such a scanning and printing system includes a scanner, a printer, a modem, a computer, etc., and prints data scanned from the scanner or facsimile data transmitted from a different system via the modem using the printer, or stores the data on a hard disk in the computer. Therefore, the scanning and printing system has a facsimile function, printer function, scanner function, and copier function, etc.

As office automation facilities, such as the scanning and printing system, have been used widely and their functions are complicated in this manner, the burden on the manufacturer to manage defects generated while using the products has increased.

Generally, a user has had to explain the situation relating to the generation of defects to a serviceman in cases where software operations have defects in a scanning and printing system having various functions. Further, the serviceman has had to go through various complicated procedures such that an application program is obtained again and the generation of defects is repeated under the same circumstances as the circumstances with defects in those cases where the defects are generated in running an application program on a host computer connected to the scanning and printing system. Therefore, the serviceman has not been able to promptly correct the defects generated in the system.

Meanwhile, the techniques of monitoring, sensing and reporting the defects generated in systems have been vigorously studied according to technical trends toward automation and the following techniques have already been patented in the U.S.

First, U.S. Pat. No. 5,589,878 to Cortjens et al., entitled "METHOD OF DETERMINING AN ERROR IN A VIDEO CONFERENCING SYSTEM CAMERA", discloses a method for controlling the operation of a camera by a controller, storing all the control signals generated during the operation of the camera, and performing the detection and correction of errors by using the stored signals later. However, in this case, all the signals generated by the camera are stored and managed, and thus a large amount of storage is required. This causes the cost to rise.

Second, U.S. Pat. No. 5,134,501 to Satomi et al., entitled "FACSIMILE APPARATUS", discloses an apparatus for storing the name of stations which are far away and frequently communicated with, storing all the control processing signals generated in the case of communicating with these stations, and outputting the stored information if defects are generated in communicating with these stations. Therefore, U.S. Pat. No. 5,134,501 lessened a burden found in U.S. Pat. No. 5,589,878. However, U.S. Pat. No. 5,134,501 has a problem in that the cause of defects related to the whole facsimile system is not analyzed.

SUMMARY OF THE INVENTION

Therefore, it is an object of the present invention to enable the tracing of defects generated in a scanning and printing system.

It is another object of the present invention to provide the minimum needed memory space for tracing the defects.

It is still another object of the present invention to promptly correct the defects generated in the scanning and printing system.

According to one aspect of the present invention, a debugging device in an apparatus having a scanning and printing system includes: an input unit for inputting a defects tracing mode and selecting a function; a facsimile machine driving unit for driving a facsimile machine to transmit and receive facsimile data and for generating operating status messages of the facsimile machine; a printer driving unit for driving a printing unit to print data and for generating operating status messages of the printing unit; a storing unit for storing the generated status messages; and a processing unit for replaying a defects-generated job, storing the generated messages in the storing unit, and outputting the stored messages according to the selection of a function in the case of setting the defects tracing mode using the input unit.

According to another aspect of the present invention, a method of debugging in an apparatus having a scanning and printing function includes the steps of: generating status messages according to the running status of the scanning and printing system, ignoring the generated messages in cases where defects are not generated, storing the generated messages in a memory by setting a defects tracing mode in cases where defects are generated, and allowing an operator to access the messages if necessary.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The objects, characteristics and advantages of the above-described invention will be more clearly understood through the preferable embodiments referring to the attached drawings.

Since the terms mentioned later are judged based upon the function of the present invention and they can be changed according to the technician's intention or a usual practice, the terms should be judged considering the overall contents of the specification of the present invention.

Figure 1:
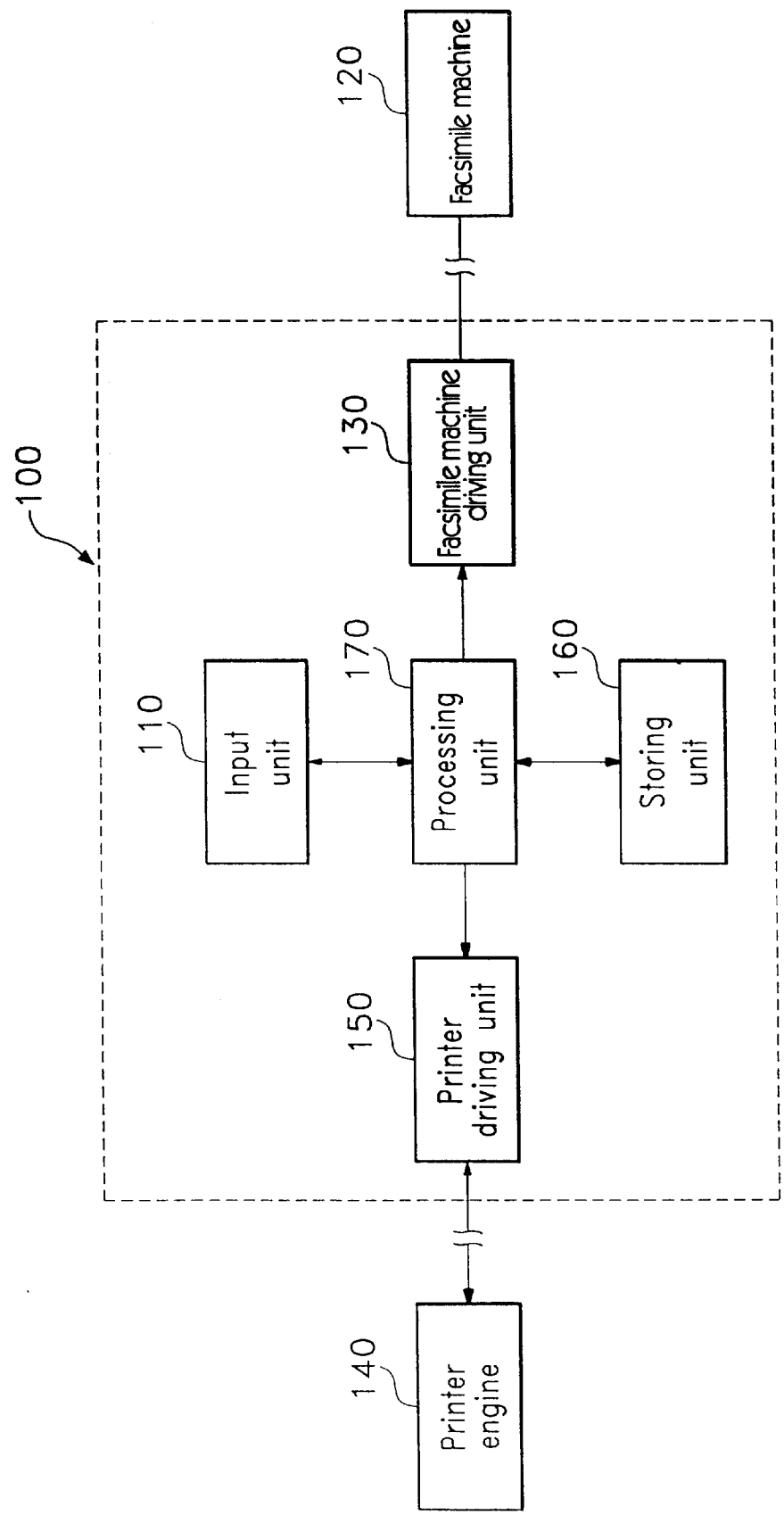
FIG. 1 is a block diagram of a debugging device in an apparatus having a scanning and printing function according to the present invention.

Referring to FIG. 1, a debugging device 100 in an apparatus having a scanning and printing function according to the present invention includes an input unit 110 for inputting a defects tracing mode and for selecting a function, a facsimile machine driving unit 130 for driving a facsimile machine 120 to receive data and generate operating status messages of the facsimile machine 120, a printer driving unit 150 for driving a printer engine 140 to print data and generated operating status messages of the printer engine 140, a storing unit 160 for storing the generated status messages, and a processing unit 170 for replaying a defects-generated job, storing the generated messages in the storing unit 160, and outputting the stored messages according to the selection of a function.

The term "replaying the defects-generated job" means that the job with defects in running the scanning and printing system is replayed under the same circumstances. For example, in the case of generating defects while receiving the facsimile data, the receiving of the facsimile data is replayed after the selection of the defects tracing mode.

Figure 2:
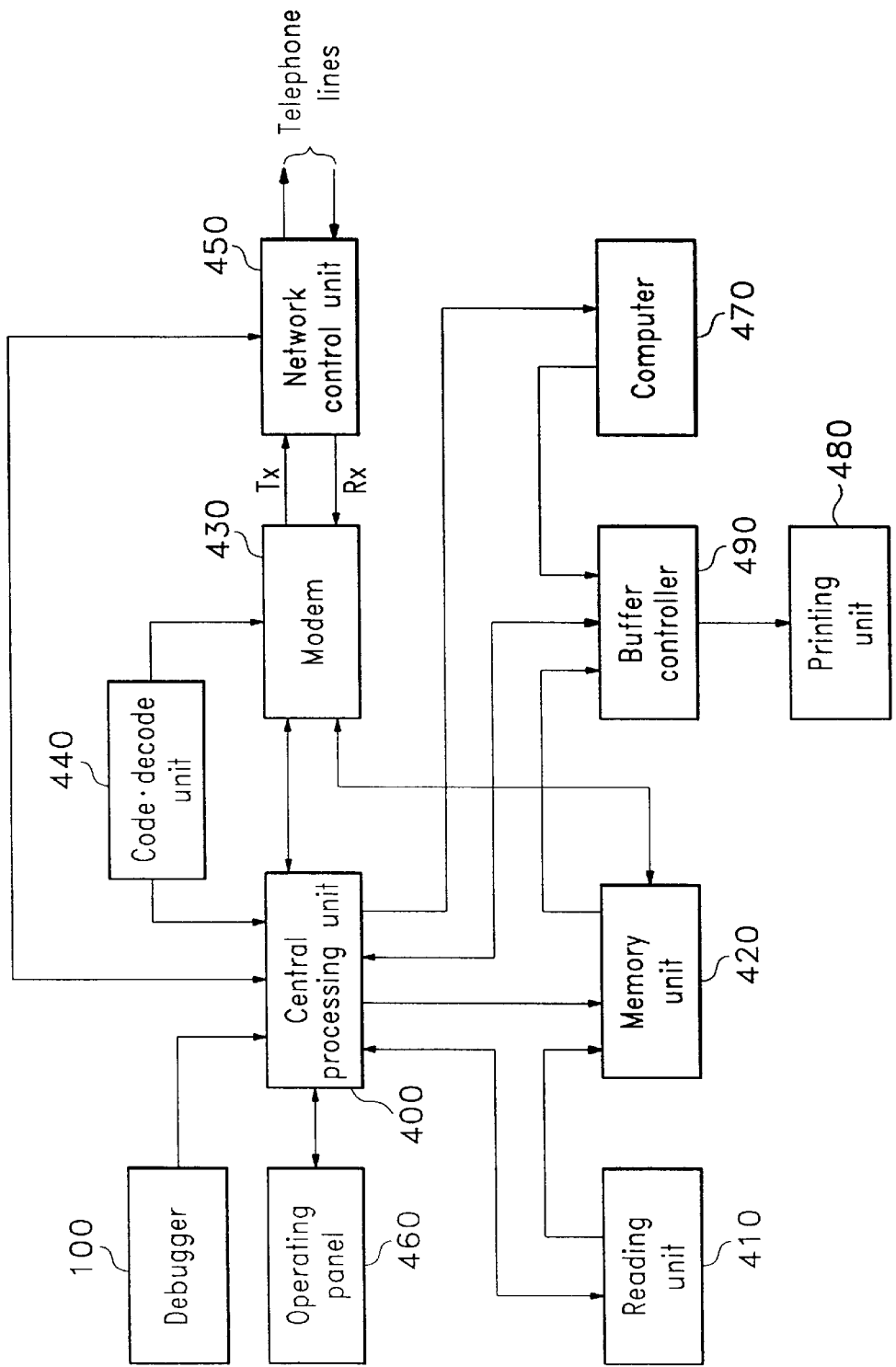
FIG. 2 is a block diagram illustrating a scanning and printing system applying an embodiment of the present invention.

FIG. 2 illustrates the scanning and printing system applying an embodiment of the present invention. The scanning and printing system includes: a central processing unit(CPU) 400 for controlling a system and processing according to a given program; a reading unit 410 for transmitting digital video data to the central processing unit 400 by scanning a picture or the letters of a document or a manuscript which is to be transmitted in a constant interval and converting the results to electrical signals; a memory unit 420 for storing program data, protocol data, letter data and voice data; a modem 430 for modulating into an analog form, for outputting the data under the control of the central processing unit 400, and for demodulating and outputting the received input signal; a code/decode unit 440 for coding or decoding data under the control of the central processing unit 400 to process effectively the data input/output to the modem 430; a network control unit 450 for interfacing the signal of the modem 430 with the signal of telephone lines while forming a communication loop of the telephone lines; an operating panel 460 for inputting various control commands by use of a plurality of keys and display units, and further displaying status and various information of system under the control of the central processing unit 400; a computer 470 having a memory or a secondary memory; a printing unit 480 for printing read data or transmitted data and data stored in the computer 470, and a buffer control unit 490 for sending data in the memory of the computer 470 or data read from the reading unit 410 to the printing unit 480. The present invention is constituted by connecting the scanning and printing system to the debugging device 100.

Preferably, the facsimile driving unit 130 of FIG. 1 may drive and manage the reading unit 410, the memory unit 420, the modem 430, the code/decode unit 440 and the network control unit 450 to process the facsimile data transmitted and received via the telephone lines. Further, the printer driving unit 150 may drive and manage the buffer control unit 490 and the printing unit 480.

Meanwhile, the facsimile driving unit 130 and the printer driving unit 150 send the information related to all the statuses generated in transmitting and receiving the data and printing the data to the processing unit 170 in a message form.

Further, in a preferred embodiment of the present invention, a debugging function is system-programed into the memory in the scanning and printing system, and is then performed using the system program without a separate debugging device being needed.

Figure 3:
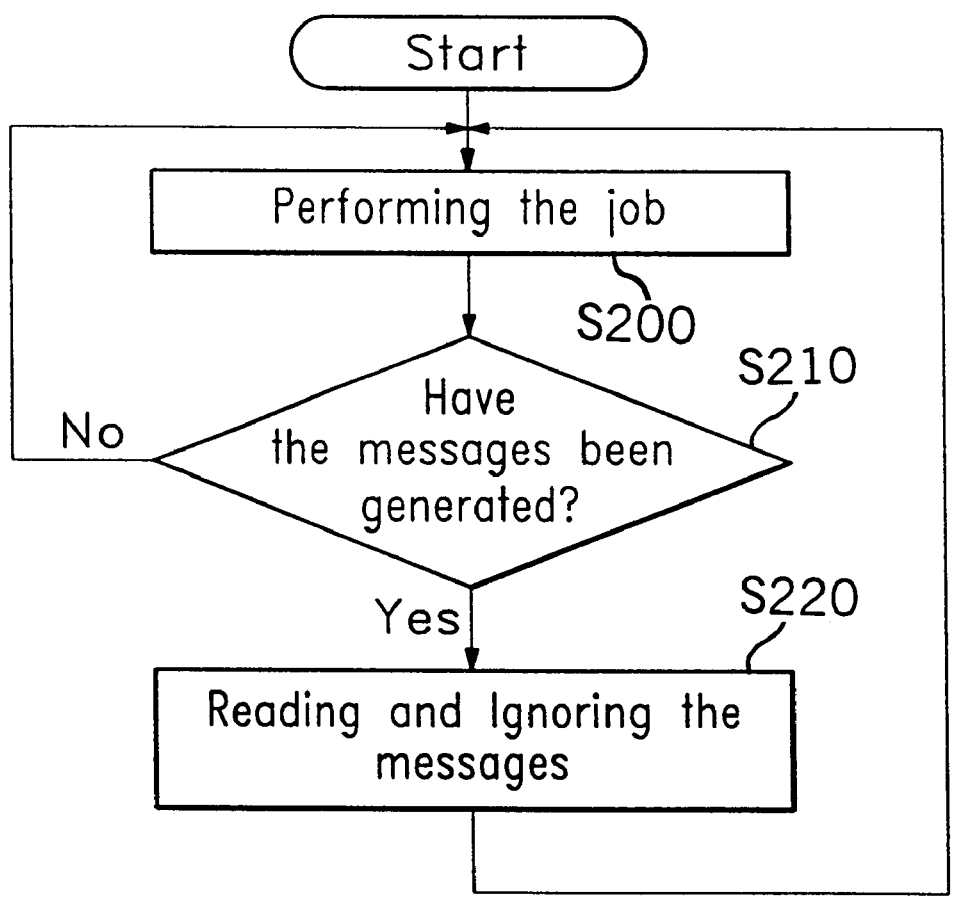
FIG. 3 is a flowchart illustrating messages processing procedures in a normal state in a method for debugging in a scanning and printing system according to the present invention.

The debugging device 100 in the apparatus having a scanning and printing system constituted as mentioned above ignores the generated status messages and continues to perform its job by running when the scanning and printing system is normally running, as shown in blocks S200, S210 and S220 of FIG. 3.

Figure 4:
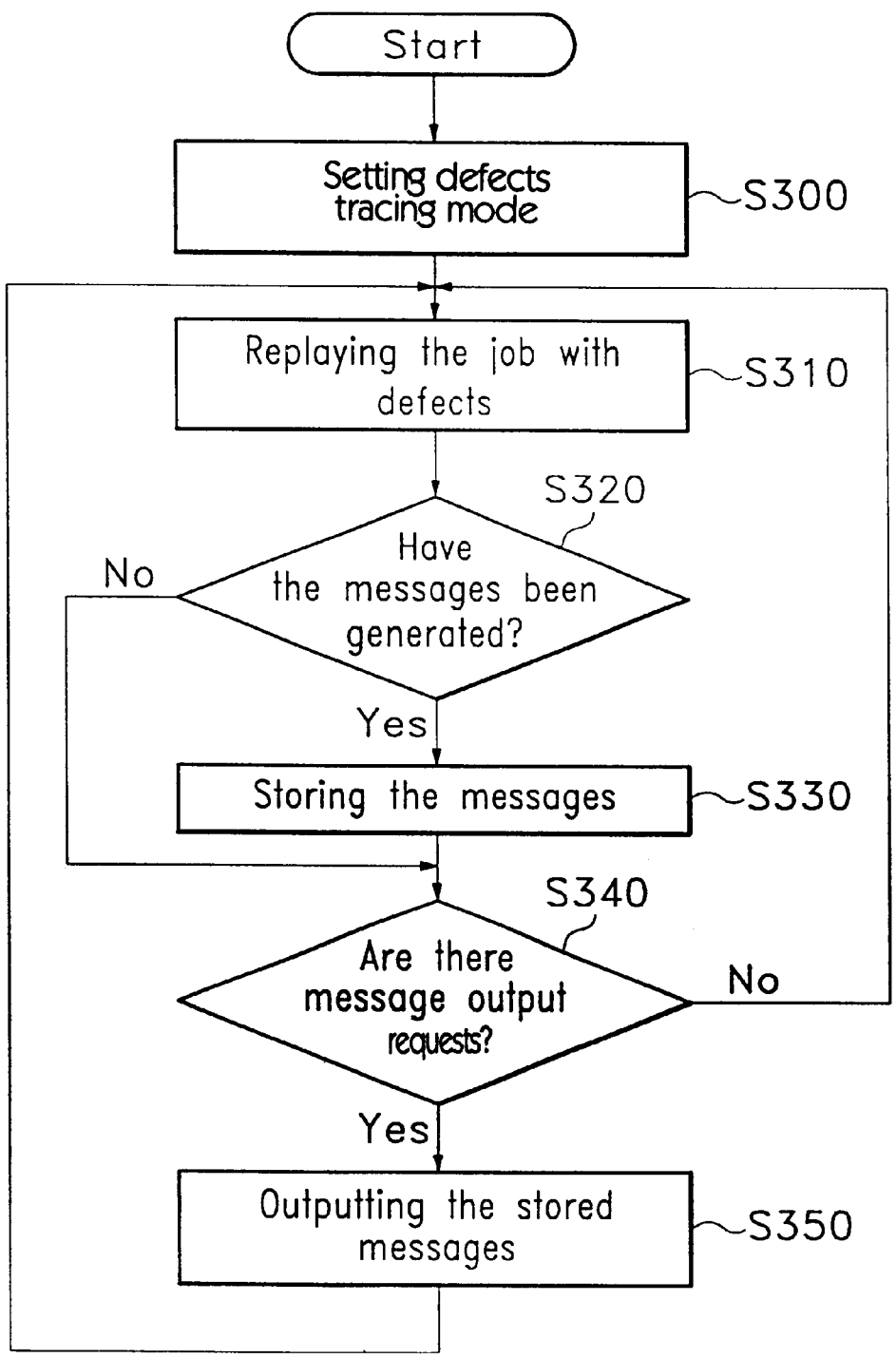
FIG. 4 is a flowchart illustrating the method of debugging in the scanning and printing system according to the present invention.

Meanwhile, if defects are generated in the scanning and printing system during running and then the defects tracing mode is set by a user of the scanning and printing system via the input unit 110 of the debugging device 100 as shown in FIG. 4, the debugging device 100 stores status messages by replaying the job with defects and prints the stored messages as requested by the user.

Next, a method of debugging in an apparatus having a scanning and printing function is detailed with reference to FIG. 4.

First, if defects are generated during running in the scanning and printing system such as that shown in FIG. 2, the defects tracing mode is set by the user of the scanning and printing system via the input unit 110 of the debugging device 100 in step S300.

After the defects tracing mode has been set, the debugging device 100 replays the defects-generated job in step S310.

As mentioned above, the replaying of the defects-generated job means that the job with defects during running the scanning and printing system is replayed under the same circumstances. For example, in cases where the defects are generated in receiving the facsimile data, if the user selects the defects tracing mode and receives the facsimile data again, a defect message is generated. This is detailed later with reference to FIG. 5.

Figure 5:
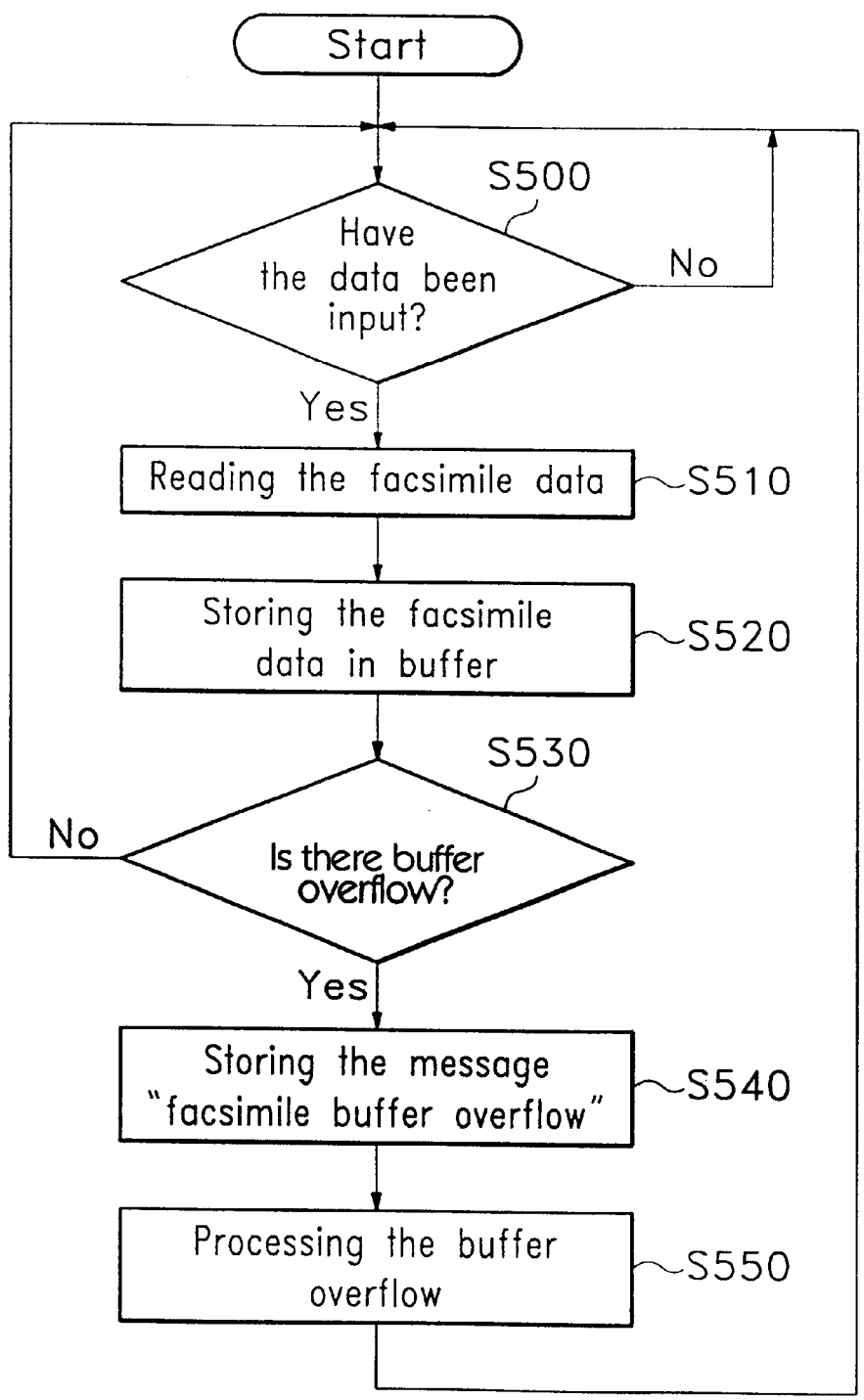
FIG. 5 is a flowchart illustrating procedures for replaying the receipt of facsimile data, generating defects messages, and storing them in cases where defects are generated during the receiving of the facsimile data according to the present invention.

Preferably, when all the defects-generated jobs are replayed so as to trace all the defects generated in the scanning and printing system, the debugging device 100 includes each program module capable of generating and storing defect messages and stores all the status messages generated during running of the scanning and printing system after selecting of the defects tracing mode shown in FIG. 5.

While replaying the defects-generated job in step S310, the debugging device 100 generates a defect message and stores the message in steps S320 and S330. For instance, the debugging device 100 stores a so called 'facsimile buffer overflow' which is one of the causes of the defects generated in receiving facsimile data. This facsimile buffer overflow is disclosed later.

After replaying such a defects-generated job and storing the defect message, the scanning and printing system outputs the stored message by means of the printer according to a user's request S340 and S350.

Preferably, the stored defect message may be transmitted via the modem 430 of the scanning and printing system to a serviceman of the scanning and printing system located far away from the scanning and printing system.

Preferably, the stored message may be transmitted to the host computer 470 connected to the scanning and printing system according to a user's request.

Referring to FIG. 5, in cases where defects are generated during reception of facsimile data, in accordance with an embodiment of the present invention, the defect message is stored, while replaying the receipt of the facsimile data after setting the defects tracing mode, as discussed below.

First, if the defects tracing mode for facsimile data receiving defects is set by a user of the scanning and printing system, the central processing unit 400 receives the facsimile data via the modem 430, reads and decodes the input data via the code/decode unit 440, and then stores the results in the buffer of the memory unit 420 in steps S500, S510 and S520.

By such a procedure, the facsimile data are repeatedly stored in the buffer until the buffer overflows.

If the buffer is caused to overflow by the input facsimile data, the facsimile driving unit 130 generates an overflow message and the processing unit 170 stores the message relating to the generated data overflow in the storing unit 160 in steps S530, S540 and S550.

For example, the message for the overflow defect may be set as the 'facsimile buffer overflow'.

If it is determined that there is buffer overflow in step S530, the processing unit 170 stores the message for the overflow defect and then processes the buffer overflow in steps S540 and S550. After that, the processing unit 170 repeats inputting data.

Preferably, the buffer overflow may be processed using a software method called a predetermined exception handling routine.

Thus, in cases where the facsimile data receiving error is generated, after the user of the scanning and printing system selects the defects tracing mode and stores the cause of the defects by receiving the facsimile data again, the cause of the facsimile data receiving error may be detected using the results later.

As mentioned above, the debugging device generates status messages according to running states of the scanning and printing system. Generally, the generated messages are ignored in cases where defects are not generated. However, the generated messages are stored in a memory by setting the defects tracing mode, and are accessed by an operator, if necessary, in cases where defects are generated. Therefore, the present invention may effectively manage the generated defects using a small amount of memory space.

While there have been illustrated and described what are considered to be preferred embodiments of the present invention, it will be understood by those skilled in the art that various changes and modifications may be made, and equivalents may be substituted for elements thereof, without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. A device for use in debugging problems encountered in operation of an apparatus having a scanning and printing function, the device comprising:

an input unit for receiving a defects tracing command from a user so as to enter a corresponding mode and to select a corresponding function;

a facsimile machine driving unit for driving a facsimile machine to transmit and receive facsimile data and for generating operating status messages of the facsimile machine;

a printer driving unit for driving a printer to print data and for generating operating status messages of the printer;

a storing unit for storing said generated operating status messages; and a processing unit responsive to the defects tracing command from the user for replaying a defects-generated job, for storing said generated operating status messages in said storing unit, and for outputting said stored generated operating status messages according to said selection of the corresponding function and entry of the corresponding mode.

2. The apparatus of claim 1, said stored generated operating status messages being output by said printer.

3. The apparatus of claim 1, said stored generated operating status messages being output to a host computer connected to said apparatus.

4. The apparatus of claim 1, wherein said processing unit replays the defects-generated job by:

receiving the facsimile data;

reading and decoding the received facsimile data;

storing results of the reading and decoding step in a buffer memory;

determining whether the buffer memory overflows;

generating and storing an overflow message; and processing a buffer overflow.

5. A method of facilitating the debugging of problems encountered in an apparatus having a scanning function and a printing function, the method comprising the steps of:

setting a defects tracing mode;

replaying a job, in the course of which defects have occurred;

determining whether status messages are generated in said replaying;

storing said generated status messages when said status messages are generated;

determining whether an output request for output of said stored generated status messages exists; and outputting said stored generated status messages when the output request exists.

6. The method of claim 5, further comprising the step of performing in a general operating mode in which all the status messages generated in said apparatus are ignored and in which the job continues when said defects tracing mode has not been set.

7. The method of claim 5, wherein the job replayed comprises reception of facsimile data, and said step of replaying the job comprises:

receiving the facsimile data;

reading and decoding the received facsimile data;

storing results of the reading and decoding step in a buffer memory;

determining whether the buffer memory overflows;

generating and storing an overflow message; and processing a buffer overflow.

* * * * *